United States Patent [19]

Kahl, Jr. et al.

[11] Patent Number: 4,484,075

[45] Date of Patent: Nov. 20, 1984

[54] INFRARED INTRUSION DETECTOR WITH BEAM INDICATORS

[75] Inventors: William G. Kahl, Jr., Brookfield; John Baldwin, Danbury, both of Conn.

[73] Assignee: Cerberus AG, Switzerland

[21] Appl. No.: 379,141

[22] Filed: May 17, 1982

[51] Int. Cl.³ ............................ G01J 5/04; G01J 5/08

[52] U.S. Cl. .................................... 250/342; 250/353

[58] Field of Search ................ 250/342, 353; 340/567; 350/452

[56] References Cited

U.S. PATENT DOCUMENTS 4,275,303 6/1981 Mudge ................................ 250/342

4,321,594 3/1982 Galvin et al. ........................ 340/567

FOREIGN PATENT DOCUMENTS

WO82/04229 12/1982 PCT Int'l Appl. ................ 350/452

*Primary Examiner*—Janice A. Howell
*Assistant Examiner*—Constantine Hannaher
*Attorney, Agent, or Firm*—Brumbaugh, Graves, Donohue & Raymond

[57] ABSTRACT

A passive infrared intrustion detector is provided with a lens which has a plurality of first lens segments, each for focusing infrared radiation from various beams of sensitivity onto an infrared detecting element. Associated with each of the first lens segments is a second lens segment, with a displaced lens center, which serves to focus light originating within the detector device into a radiated beam, which corresponds in space to the region of sensitivity of the infrared beams.

18 Claims, 8 Drawing Figures

INFRARED INTRUSION DETECTOR WITH BEAM INDICATORS

BACKGROUND OF THE INVENTION

The present invention relates to passive infrared intrusion sensing devices, and particularly to such devices which provide an indication of beam location by the emission of light from a light source within the detector device.

In U.S. Pat. No. 4,275,303, which is assigned to the same assignee as the present invention, there is disclosed a passive infrared intrusion detection system wherein there is provided within an enclosure an infrared detecting element and a light source, both arranged behind a lens element. The lens element has a plurality of lens segments, arranged in a pair of horizontal rows. The upper lens segments provide for focusing of infrared radiation from regions of space corresponding to upper beams of sensitivity onto the infrared detecting element. The lower row of lens segments are arranged directly below and in correspondence to the segments of the upper row. The lower row of lens segments perform dual functions. The first function is to provide a second set of infrared beams of sensitivity, below the first set, for the detection of intruders in regions of space closer to the location of installation of the system. In addition to focusing infrared radition from the lower set of sensitivity beams, the second row of lens segments provide for focusing of light, radiated from a light source within the detector enclosure, into a set of light beams which correspond to the beams of sensitivity for the upper row of lens segments.

Accordingly, the prior art infrared intrusion detection system provides for radiated beams of light, through the lower set of lens segments, which correspond in space to the regions of sensitivity for the upper row of lens segments. The prior art unit thus enables visual observation of the spacial location of the upper set of beams of infrared sensitivity for the purposes of installing and orienting the unit. However, the prior device has no provision for locating the direction of the lower beams of sensitivity. In addition, the dual function of the lower set of lens segments places certain constraints on the arrangement of the upper and lower beams. In particular, it is necessary to have an identical number of beams in the upper row of beams of sensitivity as in the lower row of beams of sensitivity. The lower beams must also be at substantially the same angle in azimuth as the upper beams of sensitivity. Thus, where the device is being used to provide intrusion detecton for a room, there will be upper and lower sensitivity beams which are identical in number and azimuth angle.

In addition to the desire to have independent design control for the number and orientation of the upper and lower beams of sensitivity, it is also desirable to provide a lens element wherein the light source can be visually associated with the lens segment which focuses infrared radiation from a region of space onto the detector element. In the prior art system, the location of one of the upper beams of sensitivity is indicated to the installation technician by the observance of the light through the lower lens segment. This may cause some confusion for inexperienced personnel. In order to simplify the installation procedure, and make it more understandable to the installation technician, it is desirable that there be a beam locating light for each beam of sensitivity and that the beam locating light be observed through the same area of the lens, which corresponds to the infrared beam of sensitivity. Thus, the technician can more easily locate and correlate all the beams of sensitivity for the detector system during the installation process. The ease of locating these beams of sensitivity by association with the apparent source of light on the lens segment or area responsible for the beam of sensitivity facilitates the installation "walk test" procedure wherein the technician walks within each beam of sensitivity to ascertain that the detector device is responsive to his presence therein.

It is therefore an object of the present invention to provide a new and improved infrared intrusion detector with beam indicators for each of the radiated beams of the device.

It is a further object of the invention to provide such a detector wherein the lens designer can independently control the location of each of the beams of sensitivity radiated by the device and correspondingly control the location of the radiated light beams from the device which indicate the sensitivity beam positions.

It is a further object of the present invention to provide such a device wherein the beam indicator light appears to emanate from the same area of the lens element as the corresponding beam of sensitivity.

It is a further object of the present invention to provide an infrared intrusion detector which can be more easily installed, and adjusted for location of beams of sensitivity.

It is a further object of the present invention to provide such an intrusion detector which has multiple selectable beam pattern arrangements.

SUMMARY OF THE INVENTION

In accordance with the present invention there is provided a passive infrared intrusion sensing device which comprises an enclosure having an aperture and an infrared detecting element located within the enclosure. There is also provided an alarm circuit which is connected to the detecting element and provides an electrically detectable indication in response to a detecting element output above a selected threshold level. There is also provided a light source within the enclosure having a selected spacing from the infrared detecting element. A lens unit is mounted in the aperture and comprises at least one first lens segment for receiving radiation from a first selected region of space and having a lens center, focal distance and effective lens area to focus infrared radiation emitted by an intruder within the first selected region of space onto the detecting element with sufficient energy to cause the detecting element to have an output above the threshold level and to focus light from the light source to a second region of space which is outside the first selected region. The lens unit also includes at least one second lens segment which has a lens center, focal distance and effective lens area, smaller than the effective lens area of the first lens segment, all selected to focus light from the light source into the selected region of space and to focus infrared radiation emitted by an intruder in a third region of space onto the infrared detecting element with insufficient energy to cause the detecting element to have an output above the threshold level.

In one preferred embodiment, the light source is mounted within the enclosure vertically below the detecting element by a selected spacing. The first and second lens segments have lens centers which are spaced from each other by the same selected spacing. The lens center of the first lens segment is arranged to radiate light from the light source above the first selected region of space, into an area which is usually not observed when viewing the detecting device. The lens unit can be provided with a plurality of the first and second lens segments to radiate and receive energy from a plurality of first regions of space. The first regions of space can be displaced in elevation or azimuth from each other.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
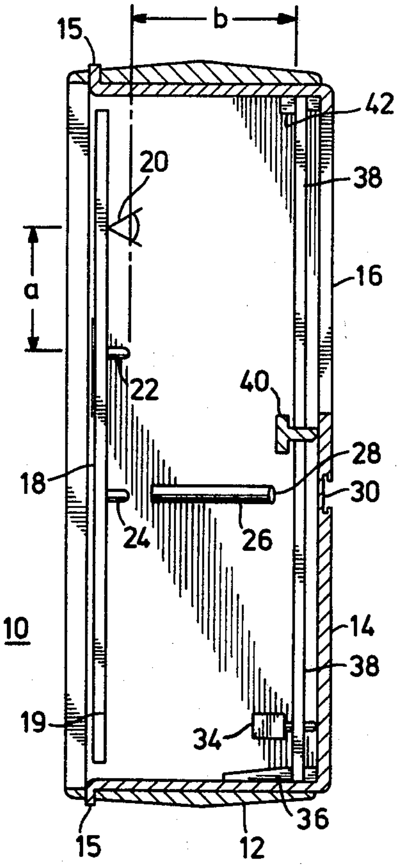
FIG. 1 is a side elevation cross-section view of a detecting device in accordance with the present invention.
Figure 2:
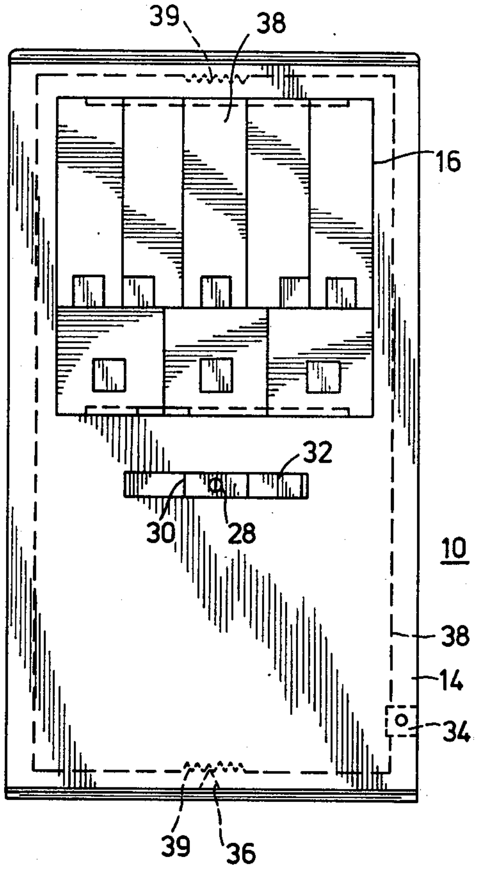
FIG. 2 is a front elevation view of the FIG. 1 detecting device.

In FIGS. 1 and 2 there is illustrated a preferred embodiment of a detector device 10 in accordance with the present invention. The detector device 10 includes an enclosure 12 which is adapted to be mounted to a wall or other vertical building member with the front face shown in FIG. 2 facing outward from the wall. The device 10 includes a cover 14 mounted on the front surface. The cover 14 has an aperature 16 for the passage of infrared radiation into the enclosure. Within the enclosure 12 there is provided a printed circuit board 18 which includes an infrared detecting element 20 and a light source 22.

Typically the circuit board 18 includes an electronic circuit which responds to the output of detector device 20 to provide an electrically detectable indication of an alarm condition. For example, the circuit may include a normally open relay which is held in the closed condition and allowed to go to its open position in response to detection of an intruder. Those skilled in the art will further recognize that the circuit 18 will include circuit elements which evaluate the output of detector device 20 to discriminate between an intruder and infrared radiation from background objects. In this respect the circuit may be designed to respond to detector outputs which have a rate of change corresponding to an intruder. The circuit usually includes a threshold device, which activates the alarm indicator (e.g. the relay) only when the detected infrared radiation has sufficiently strong signal levels to indicate the probability that an intruder has entered a protected area.

Also provided on printed circuit board 18 is a light source 24. Light source 24 is located adjacent a solid optic light conduit 26 which conducts light emitted by source 24 to an opening 30 in the cover 14. The end 28 of light conduit 26 adjacent opening 30 is facaded or rounded to provide for the horizontal spreading of light from light source 24 for observation through opening 30 for purposes of testing the unit by the "walk test" procedure. In addition the end 28 of light conduit 26 is skewed in the vertical direction to compensate for the action of lens 38, a portion of which is between opening 30 and end 28. The lens unit portion adjacent opening 30 will act as a prism and tend to deflect light vertically. By skewing the end 28, appropriate compensation in light direction can be provided. A slide cover 32 is arranged on cover 14 for selectively closing opening 30 so that the light from source 24 is not visible during normal use of the device.

Light source 24 is arranged to be illuminated when the detecting device senses the presence of an intruder and gives an alarm indication. Light source 24 is therefore used during installation and/or testing of the detector device 10 and the light from light source 24 is obliterated by slide cover 32 during normal use of detector device 10.

The bottom or rear wall of enclosure 12 is provided with an opening through which connecting wires 19 may be threaded in order to connect circuit board 18 to a power supply and external alarm monitoring devices, such as a central alarm system.

Cover 14 is attached to enclosure 12 by means of dogs 15 which fit into accommodating openings in enclosure 12. The cover can be removed by depressing dogs 15 and pulling the cover outward. A tamper switch 34 is provided and connected to the circuit on circuit board 18 for the purpose of indicating the removal of the cover. As will be further described, the tamper switch 34 is activated when the cover 14 is moved to a partially open position, for example, by dislodging the lower dog 15 and pulling the bottom portion of cover 14 outward by a small amount. In one arrangement according to the invention, the tamper switch 34 is used to activate light 22 for the purpose of locating the beams of sensitivity to infrared radiation, as will be further described.

Figure 3:
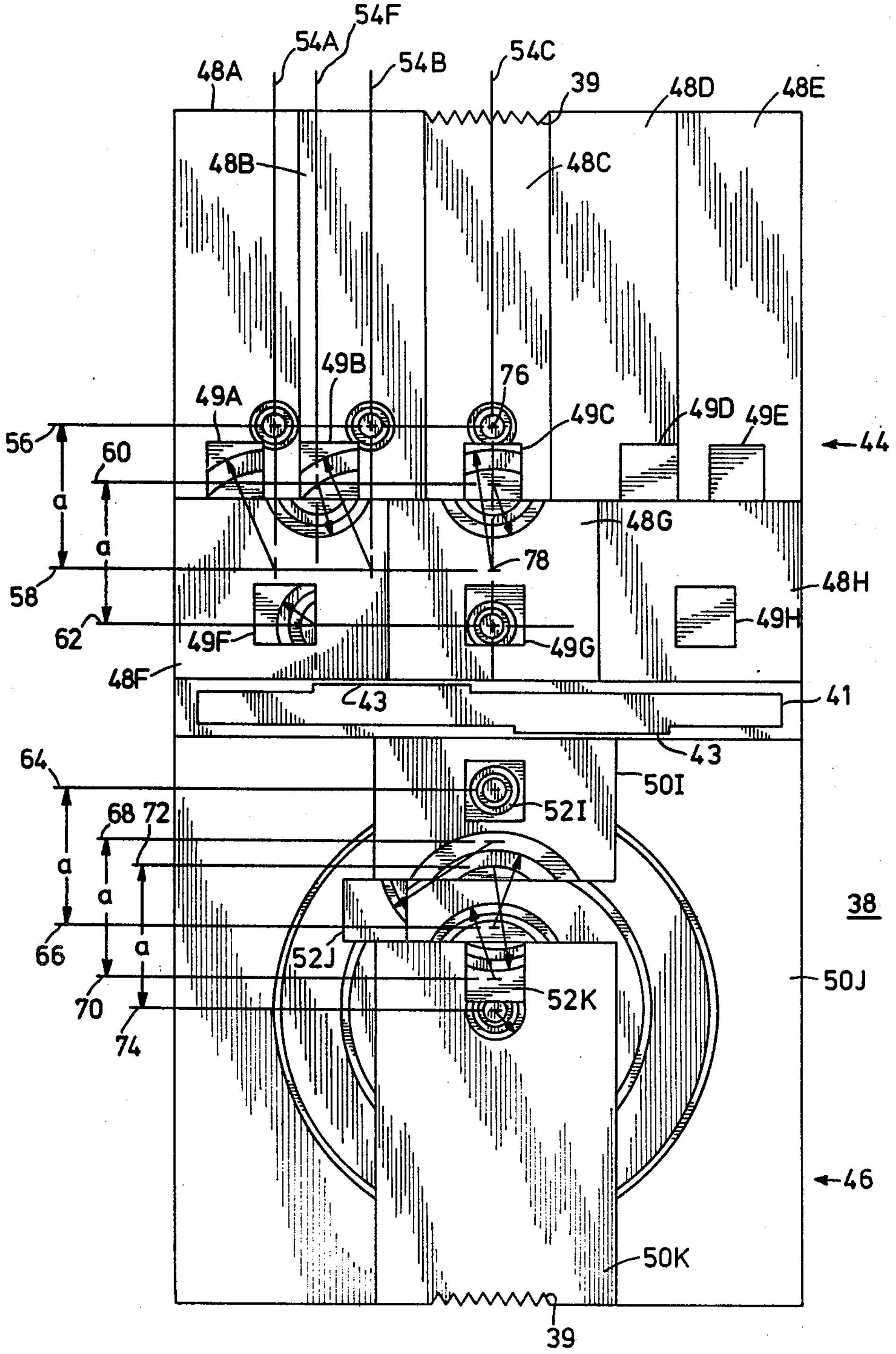
FIG. 3 is a plan view of the lens unit used in the detecting device of FIGS. 1 and 2.

Immediately behind cover 14 there is provided a lens unit 38, which is partially visible through aperture 16 in FIG. 2 and which is more fully described in FIG. 3. Lens unit 38 is preferably made of plastic and includes fresnel lens segments for focusing infrared radiation onto detector element 20 and for focusing radiation from light 22 into pattern locator beams, which will be further described. The focal length of the lens segments of lens unit 38 is selected to be approximately equal to the spacing b by which the infrared detecting element 20 and light source 22 are spaced from the lens unit 38. Detector 20 is spaced from light element 22 by a vertical selected displacement a for purposes which will be further described.

The lens unit 38 is provided at its upper and lower edges with sets of notches 39 for locating the lens unit at one of a selected number of discrete horizontal positions. In order to accommodate the positioning of lens element 38 in a horizontal direction, the lens element is mounted within slots 42 at the top of cover 14, and is mounted to a a double slot track 40 which retains the lens unit at the center of cover 14. These tracks and cover 14 may be curved slightly. At the bottom of cover 14 there is provided a ridge 36 which fits into and engages a selected one of the notches 39 for retaining lens 38 at one of the selected horizontal positions when the cover 14 is closed against the enclosure 12.

Figure 1A:
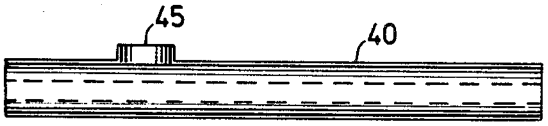
FIG. 1A is a rear elevation view of the double slot track used in the detecting device of FIG. 1.

FIG. 3 shows the entire lens unit 38. The lens unit 38 has two lens portions, an upper portion 44 and a lower portion 46. It is arranged so that the lens unit may be inserted into the cover 14 in either of two orientations, one with the lens portion 44 positioned over the aperture 16 as shown in FIG. 2, and the other wherein the lens portion 46 is positioned over the aperture 16. In order to provide for this alternate positioning, lens unit 38 includes notches 39 at both the upper and lower edges. Lens unit 38 includes a central slot 41 which has a pair of notches 43 asymmetrically arranged. Slot 41 is arranged to fit over double slot track 40 on cover 14 in a sliding engagement. The asymmetrical arrangement of notches 43 and corresponding portion 45 of track 40 shown in FIG. 1A provides a restriction on the manner on which the lens unit 38 can be positioned on the cover 14, that is, it can only be positioned with one surface of lens unit 38 in the outward position, for example the surface with the fresnel lens. By providing a pair of notches 43 the lens unit can be inserted onto the cover 14 with only one surface in the outer position and with either lens portion 44 or lens portion 46 arranged in aperture 16.

Lens portion 44 is arranged so that when it is positioned in aperture 16, there will be 8 beams of infrared sensitivity focused on detector element 20 by the various first lens segments of the lens portion 44. In particular, lens portion 44 includes first lens segments 48A through 48H. Each of these first lens segments has a lens center which is displaced to a position which determines the direction from which infrared radiation will be focused on detecting element 20. Specifically, lens segment 48A has an optical lens center which is located at the intersection of line 54A and line 56, as indicated by the fresnel lens contours, which are partially illustrated. Likewise, lens segment 48B has a lens center which is located at the intersection of line 54B and line 56 and lens segment 48C has a lens center, designated 76, which is at the intersection of line 54C and line 56. The lens centers for segments 48D and 48E are symmetrical with respect to the lens centers for segments 48B and 48A respectively. Lens segments 48A through 48E cause radiation which originates in regions of space corresponding to the five upper beams A through E in FIG. 4 to be focused on infrared detecting element 20. The orientation in both azimuth and elevation for each of these beams of infrared radiation sensitivity is determined geometrically by the location of the effective lens centers for each of lens segments 48A through 48E and the location of sensing element 20.

Within the physical area of lens portion 44 which is encompassed by lens segments 48A through 48E, there are provided second lens segments 49A through 49E. Each of these second lens segments has a substantially smaller area than the corresponding first lens segments 48A through 48E, as illustrated. Further, each of these second lens segments 49A through 49E has an effective lens optical center which is displaced from the optical lens centers of the respective first lens segments 48A through 48E by a vertical displacement a, which corresponds to the displacement of light source 22 from infrared detecting element 20. The optical lens centers for the fresnel lenses which form lens segments 49A through 49C are illustrated in FIG. 3. These lens centers occur at the intersection of line 58 with lines 54A 54B and 54C respectively. It will be noted, as illustrated in FIG. 3, that line 58 is displaced vertically by a distance a from line 56.

Figure 4:
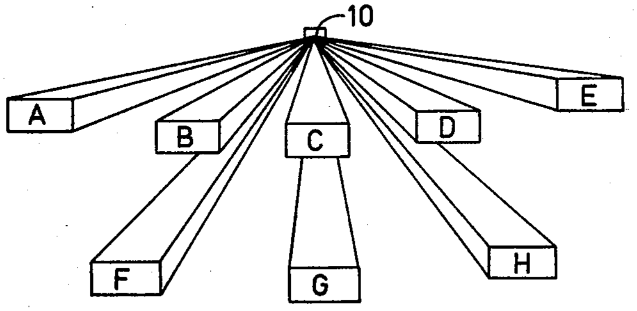
FIG. 4 is a perspective view of the patterns of beam sensitivity of the device of FIGS. 1 and 2.

Each of the first lens segments 48A through 48E of the upper row of lens segments on the lens portion 44 is for focusing infrared radiation originating in regions of space corresponding to respective beams of infrared sensitivity A through E, shown in FIG. 4, onto infrared detecting element 20. Each of second lens segments 49A through 49E has a lens center which is arranged to focus radiation from light source 22 into a beam which corresponds to the region of space from which radiation is received on infrared beams of sensitivity A through E. It should be noted that the optical lens centers for each of the first segments 48A through 48E are displaced from the physical centers of the area and each of the lens centers for lens segments 49A through 49E are likewise displaced from the centers of the respective segments, and in fact are not located within the segments themselves. The second lens segments 49A through 49E are, however, conveniently located in the same physical area of lens portion 44 as the respective first lens segments 48A through 48E. This co-location of the respective first and second lens segments facilitates installation of the detector unit, as will be further described.

In addition to the upper row of lens segments 49A through 49E, which provide the upper row of beams of sensitivity A through E, shown in FIG. 4, there is provided a second and lower row of lens segments 48F 48G and 48H, for focusing infrared radiation from a second a lower set of beams of sensitivity, F, G and H, shown in FIG. 4 onto infrared detecting element 20. Likewise, within the physical area of each of the first lens segments 48F through 48H of the second row of lens segments in the lens portion 44 there is provided a second lens segment 49F, 49G and 49H. The optical lens centers of the first lens segments of the lower row are located at the intersection of line 60 and lines 54F, 54C and 54H (not illustrated). Thus, there are provided three lower beams of infrared radiation sensitivity F, G and H, which are displaced in azimuth from each other, by reason of the geometrical arrangement of the displacement of the lens segment centers, and are all displaced in elevation from the orientation of beams A through E of the first row of lens segments. The second lens segments of the second and lower row 49F, 49G, and 49H have optical lens centers which are arranged at the intersection of line 62 and line 54F, 54C and 54H. These second lens segments of the second row are likewise provided for focusing radiation from light source 22 into beams which radiate into the same regions of space as the regions of sensitivity of beams F, G and H. As with the second lens segments of the first row, the vertical location of the second lens segments 49F, 49G and 49H are displaced vertically from line 60, corresponding to the center of the first lens segments of the second row, by a distance a, which corresponds to the displacement between the location of infrared sensing element 20 and light source 22. Also as in the case of the first row of lens segments, the lens segments 49F, 49G and 49H of the second row of lens segments are located within the corresponding first lens segments and have smaller areas than the first lens segments.

While the light from light source 22 will most often have a different wavelength than the infrared radiation detected by element 20, it is convenient to use the same lens design for both the first and second lens segments. Because high infrared sensitivity is desireable for purposes of detecting an intruder, the lens material is conveniently selected to have high transparency in the infrared, for example 10 microns, and moderate transparency in the visible spectrum. High density polyethylene has been found to be suitable. Likewise, the fresnel lenses may be optimized for focusing of infrared radiation.

The various lens segments are each formed to have essentially the same refracting surfaces as a portion of a large fresnel lens having the centers indicated. Typically a lens may have concentric grooves spaced at 125 grooves per inch and a focal length of 1.2 inches, corresponding to space b.

Typically, the second lens segments are selected to have an effective area which is substantially less than the effective area of the corresponding first lens segments, for example, 10%. Effective operation can most likely be achieved with a second lens segment area in the range of 5 to 25% of the first lens segment area. The term "effective lens area" relates, not only to the physical area of the lens segments, but also takes into account the variations in illumination by light source 22 of different regions of the lens portion 44, and the variations in sensitivity of detector element 20 to radiation received and focused through various portions of lens portion 44. For example, radiation which is received and focused by a lens segment of a given area far removed from the center of the lens will have less intensity than radiation received and focused by the same physical area at the center of the lens. In this respect, the distance which the radiation must travel is also taken into consideration in selecting the effective lens area of the first and second lens segments. For example, the area of lens segments 48A through 48E are larger than the area of lens segments 48F through 48H, since as becomes evident from consideration of the vertical patterns shown in FIG. 5, the upper row of patterns of sensitivity must respond to infrared radiation originating at a greater distance than the lower row of patterns of sensitivity. Further, since the area allocated to lens segment 48A is not immediately in front of the sensing element 20, lens segment 48A has a larger area than lens segment 48C. Accordingly, the term "effective lens area" is meant to encompass considerations of relative illumination or response to radiation through the applicable portion of the lens, by either the light source 22 or the detecting element 20, and also to take into consideration the relative distance that the light or infrared radiation must travel outside of the lens unit.

Lens portion 46 of lens 38, which can be positioned in aperture 16 by inverting the lens unit 38, consists of three first lens segments 50I, 50J and 50K for focusing radiation originated in three respective regions of space onto detecting element 20. All of these first lens segments have effective lens optical centers on the center line of lens unit 38 in the horizontal direction. Lens segment 50I has a lens center located vertically on line 66. Lens segment 50J has an effective lens center located vertically on line 70 and lens segment 50K has an effective optical lens center which is located vertically on line 74. Because of the vertical displacement of the various optical lens centers for segments 50I, 50J and 50K these lens segments focus infrared radiation from regions of space corresponding to sensitivity beams I, J and K in FIG. 6 onto detecting element 20 when the lens portion 46 is positioned in aperture 16 of detecting device 10. It should be noted that lens segment 50J is substantially H shaped to provide appropriate lens area. Each of the lens segments 50I, 50J and 50K include second lens segments 52I, 52J and 52K within the geometrical area of the first lens segments. As was explained with respect to lens portion 44, second lens segments 52I, 52J and 52K have effective optical lens centers which are vertically displaced from the effective optical lens centers of the corresponding first lens segments by a displacement a, which corresponds to the displacement of light source 22 from detecting element 20.

OPERATION OF THE INVENTION

Figure 5:
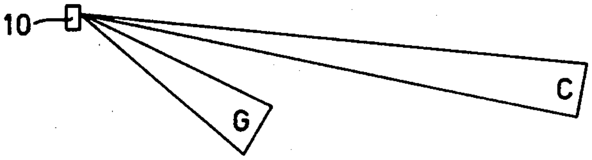
FIG. 5 is a cross sectional view of two of the patterns of sensitivity of FIG. 4.
Figure 7:
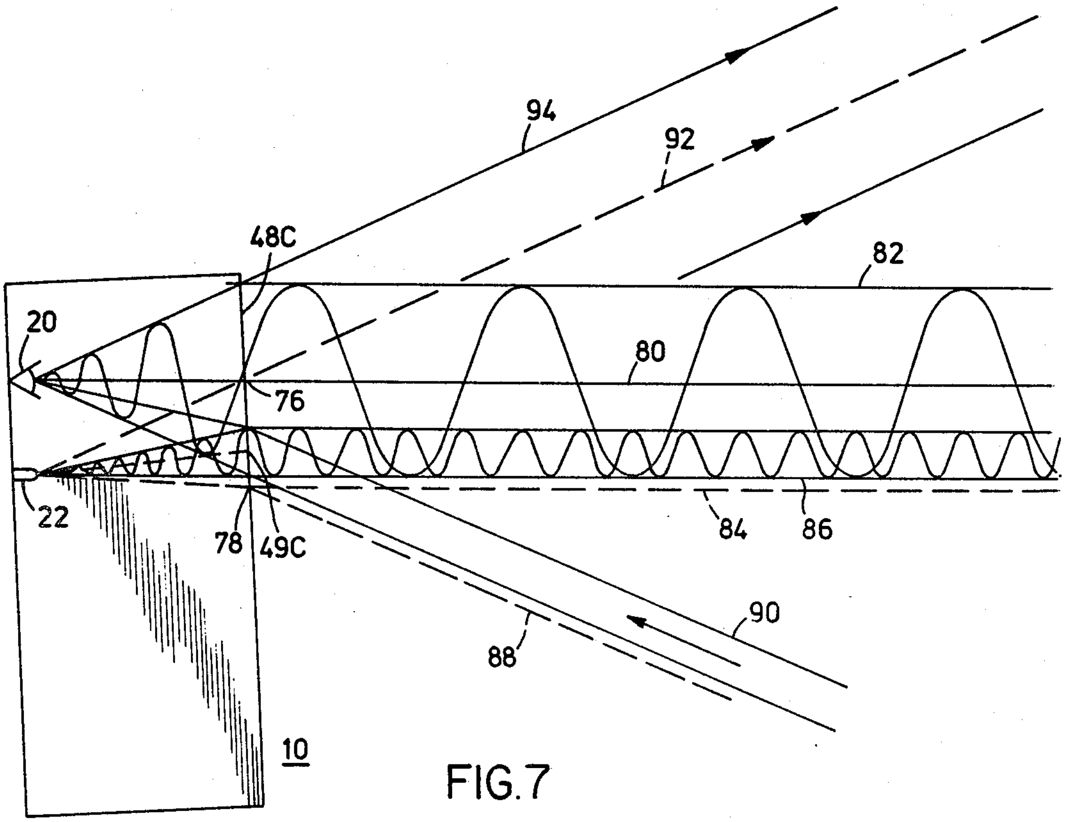
FIG. 7 is a simplified cross sectional view of the FIG. 1 device illustrating the radiation and sensitivity patterns.

The operation of the first and second lens segments described with respect to FIG. 3 will now be explained with respect to a particular set of first and second lens segments, namely first lens segment 48C and second lens segment 49C. As was previously noted, first lens segment 48C focuses infrared radiation from a centrally located, high elevation region of sensitivity, corresponding to beam C in FIGS. 4 and 5, onto detecting element 20 while lens segment 49C focuses radiation from light source 22 into the corresponding region of space. In FIG. 7, there is shown a simplified diagram of the detecting device 10 including infrared radiation detector 20, light source 22 and portions of lens element 38 positioned in aperture 16. In particular, there is illustrated lens segment 48C which has an effective optical lens center 76. Optical lens center 76 is preferably located at a position on the lens which is slightly below the position of infrared detecting element 20, the amount of this difference in vertical positioning depending on the elevation angle at which it is desired to have a beam of infrared radiation sensitivity. Line 80 illustrated in FIG. 7 corresponds to a line drawn from infrared detecting element 20 through the center 76 of lens segment 48C. This indicates the center of beam C of infrared radiation sensitivity, which is shown in FIGS. 4 and 5, and which is formed by the operation of lens segment 48C in conjunction with infrared radiation detector 20. As illustrated by the large sine wave within boundary 82, infrared radiation within the region of space, corresponding to beam C, is focused by lens segment 48C onto detecting element 20. Likewise, there is illustrated in FIG. 7 a dotted line 84 which intersects the center 76 of lens segment 49C and light source 22. This establishes the direction of the beam which is formed by lens segment 49C from light emanating from source 22. As indicated by the small sine wave 86, this beam of light proceeds in a direction which corresponds to the direction of sensitivity for infrared radiation focused by lens segment 48C onto detecting element 20, so that there is a beam of light in the same direction as the beam of infrared radiation sensitivity which is designated beam C in FIGS. 4 and 5.

The light radiated from source 22 and focused by lens segment 49C is used to identify and locate the beam of sensitivity during installation and alignment of the device. When light source 22C is illuminated and an observer walks into the region of space corresponding to beam C, he can observe visible light from source 22 which will appear to substantially illuminate lens segment 49C. This illumination is only observable from within the focused light beam. Thus, the observer has a clear indication that he is within a beam of infrared radiation sensitivity and that that beam corresponds to the beam of radiation sensitivity focused onto infrared radiation detector 20 by lens segment 48C, since the illuminated lens segment 49C, which he observes, is within the same physical area as lens segment 48C, and in fact, forms a part thereof. By moving about the room in which the detector device 10 is installed, one can likewise view the position of each of the eight beams of infrared radiation sensitivity by walking into and observing visually the illumination of the various second lens segments 49 corresponding to each of the eight beams of infrared radiation sensitivity. Thus, the observer not only can determine the location of each of the beams of sensitivity, but he can easily associate the eight anticipated beams with their corresponding segments of the lens and thereby determine the complete orientation of the detector device.

While this observation of the location of the beams of radiation sensitivity is in progress, the installing technician can adjust the horizontal or azimuth location of the beams together, by inserting a screwdriver through aperature 16 to engage notch 43 in slot 41 and physically move lens 38 horizontally to one of the positions determined by notches 39. As a convenient way of providing for this adjustment tamper switch 34 can be arranged to close and cause the illumination of light source 22 when the cover 14 is moved from the fully closed position shown in FIG. 1 to a partially open position at the bottom of cover 14 adjacent tamper switch 34. This slight movement of the cover, does little to effect the direction of the beams of sensitivity which are determined by the vertical and horizontal positions of the various lens segment centers. The movement of the cover 14 into the partially open position, in addition to operating tamper switch 34, loosens the fit between ridge 36 and notches 39 so that lens 38 can easily be moved horizontally using a tool inserted into notch 43 through aperture 16. Thus, the technician can adjust the azimuth location of the beams of sensitivity to desired positions and can easily identify which of the eight beams he is observing.

Figure 6:
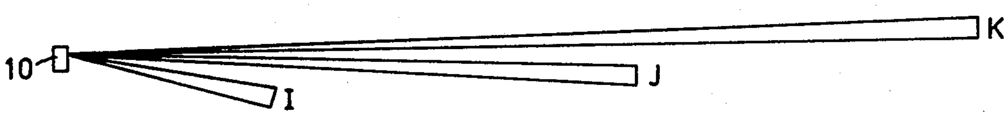
FIG. 6 is a side view of the patterns of sensitivity available with the device of FIGS. 1 and 2 using the lens segments of the lower portion of FIG. 3.

It will be recognized by those skilled in the art that the same type of installation procedure and adjustment can be effected when lens 38 is inserted in the upside-down position from the position illustrated in FIG. 3, so that lens portion 46 is positioned adjacent aperture 16, and the device radiates only three vertically displaced beams, which are illustrated in FIG. 6.

In the device shown in U.S. Pat. No. 4,275,303, which is discussed above, there are provided upper and lower rows of lens segments, and the lower row of lens segments serves a dual purpose of providing beam orientation and also providing a lower row of beams of sensitivity. As previously mentioned, this has certain disadvantages with respect to degrees of freedom in determining where the beams of sensitivity will fall on a particular device. In the present invention, deliberate steps are taken so that the second lens segments, for example, 49 or 52, do not form beams of infrared sensitivity, but only serve the function of providing a radiated beam of light to indicate beam position. To this end, the second lens segments 49 and second lens segments 52 have a substantially smaller effective lens area than the corresponding first lens segments. Accordingly, referring again to FIG. 7, the amount of infrared radiation from an intruder which is focused onto infrared detecting element 20 by lens segment 49C, for example, is insufficient in most cases to trigger the threshold circuit described above, which is normally associated with a passive infrared detecting element. Thus, while there is a beam of sensitivity to infrared radiation along path 90, having an axis 88 formed by the intersection of the center 78 of lens segment 49C and detecting element 20, the amount of radiation focused from this beam of sensitivity is substantially less than that focused by one of the beams of infrared sensitivity formed by the first lens segments, for example, 10% of the energy, and thus under most circumstances an intruder within this additional beam of sensitivity would not be detected because of the effect on the infrared detecting element would cause an output signal from the detecting element which is below the threshold level of the detecting circuit on circuit board 18. In some circumstances an intruder at close range may be detected.

In addition to a further beam of infrared sensitivity 90 illustrated in FIG. 7, it will be recognized that light from light source 22 will also be focused by lens segment 49C into a light beam 94 along axis 92 corresponding to a line which intersects lens segment center 76 and light source 22. This beam, as noted in FIG. 7, occurs at a position which is above the axis of the upper beam 80 and therefore under most circumstances merely causes a beam of light to be radiated toward the ceiling of a room, which would not be observed by test personnel installing the device. In the event the device is installed near the floor of a room, for example, facing down a hallway, this beam would radiate into the floor and again would not be observed by test personnel to cause confusion as to the orientation of the beam of infrared radiation sensitivity. Accordingly, as illustrated in FIG. 7, the beam 90 caused by the second lens segment focusing infrared radiation on the infrared radiation detecting element 20 is rendered ineffective, by reason of the smaller area of the second lens segment with respect to the first lens segment 48C, so that the circuit threshold level is usually not reached. The additional beam 94 which is caused by the interaction of the first lens segment 48C and light source 22 is rendered ineffective by causing that beam to radiate in a direction which usually would not be observed by installation or inspection personnel.

As previously noted, circuit board 18 is provided with a light source 24 which is illuminated in response to intrusion detection by the circuit. This is commonly called the "alarm indicator lamp". In the present invention, the alarm indicator lamp can be effectively used during installation and/or testing when the technician partially removes the cover 14 activating tamper switch 34 to illuminate light source 22. The technician can then observe the position of each of the beams of infrared radiation sensitivity, and by moving about within each beam test the response of the detector device to infrared radiation by observing the activation of the alarm indicator lamp 24 being activated. After the testing procedure, cover 14 can be returned to its original position deactivating light source 22, and slide cover 32 can be positioned over opening 30 so that an intruder would not observe the activation of the alarm indicator lamp.

While there has been described what is believed to be the preferred embodiment of the present invention, those skilled in the art will recognize that other and further modifications may be made thereto without departing from the spirit of the invention, and it is intended to claim all such changes and modifications as fall within the scope of the invention.

We claim:

1. A passive infrared intrusion sensing device, comprising:

an enclosure having an aperture;

an infrared detecting element in said enclosure;

an alarm circuit, connected to said detecting element for providing an electrically detectable indication in response to a detecting element output above a selected threshold level;

a light source within said enclosure having a selected spacing from said infrared detecting element;

and a lens unit, mounted in said aperture, said lens unit comprising:

at least one first lens segment for receiving radiation from a first selected region of space and having a lens center, focal distance and effective lens area selected to focus infrared radiation emitted by an intruder within said first selected region of space onto said detecting element with sufficient energy to cause said detecting element to have an output above said threshold level, and to focus light from said light source to a second region of space outside said first selected region; and at least one second lens segment, having a lens center, focal distance and an effective lens area between about 5 and 25 percent of the effective lens area of said first lens segment, selected to focus light from said light source into said first selected region of space and to focus infrared radiation emitted by an intruder in a third region of space onto said infrared detecting element with insufficient energy to cause said detecting element to have an output above said threshold level.

2. A passive infrared intrusion sensor as specified in claim 1, wherein the effective lens area of said second lens segment is approximately 10% of the effective lens area of said first lens segment.

3. A passive infrared intrusion sensing device comprising:

an enclosure, adapted to be mounted to a vertical wall, and having a nominally vertical aperture oriented outward from said wall;

an infrared detecting element in said enclosure, having a selected first spacing from said aperture;

an alarm circuit, connected to said detecting element for providing an electrically detectable indication in response to an output from said infrared detecting element above a selected threshold level;

a light source, mounted within said enclosure vertically below said detecting element by a selected second spacing; and a lens unit, mounted in said aperture, said lens unit comprising:

at least one first lens segment for receiving radiation from a selected region of space, said first lens segment having a focal distance corresponding to said first spacing, having a lens center between said detecting element and said region of space, said lens center being vertically above said light source, and having an effective first lens area to focus infrared ratiation emitted by an intruder within said first selected region of space onto said detecting element with sufficient energy to cause said detecting element to have an output above said threshold level and to focus light from said light source to a second region of space above said first selected region; and at least one second lens segment for focusing radiation from said light source into said first selected region of space, said second lens segment having a focal distance corresponding to said first spacing, having a lens center vertically below said lens center of said first lens segment by said selected second spacing, and having an effective second lens area between about 5 and 25 percent of the effective first lens area, to focus infrared radiation emitted by an intruder within a third region of space onto said infrared detecting element with insufficient energy to cause said detecting element to have an output above said threshold level.

4. A passive infrared intrusion sensor as specified in claim 3, wherein the effective lens area of said second lens segment is approximately 10% of the effective lens area of said first lens segment.

5. A passive infrared intrusion sensing device as specified in claim 1 or claim 3 wherein there are provided a plurality of said first lens segments, each for focusing radiation from one of a corresponding plurality of first selected regions of space onto said detecting element, and wherein there are provided a corresponding plurality of said second lens segments, each for focusing light from said light source into one of said corresponding plurality of first selected regions of space, and wherein all of said corresponding second regions of space are above all of first regions of space.

6. A passive infrared intrusion sensing device as specified in claim 5 wherein said plurality of first lens segments include lens segments having lens centers displaced horizontally from each other, and wherein the lens centers of the corresponding second lens segments have corresponding horizontal displacements, thereby to form selected first regions of space displaced in azimuth.

7. A passive infrared intrusion sensing device as specified in claim 5 wherein said plurality of first lens segments include lens segments having lens centers displaced vertically from each other, and wherein the lens centers of the corresponding second lens segments have corresponding vertical displacements, thereby to form selected first regions of space displaced in elevation.

8. A passive infrared intrusion sensing device as specified in claim 5, wherein each of said first lens segments extends over an area of said lens unit, and wherein each of said second lens segments is within the area of its corresponding first lens segment.

9. A passive infrared intrusion sensor as specified in claim 5, wherein at least some of said first and second lens segments have lens centers displaced from the geometric centers of said segments.

10. A passive infrared intrusion sensor as specified in claim 9 wherein at least some of said first and second lens segments have lens centers outside the physical area of said segments.

11. In a passive infrared intrusion detector wherein an infrared detecting element is enclosed within an enclosure having an aperture formed in one wall of said enclosure, wherein there is provided a light source in said enclosure having a selected displacement from said detecting element, and wherein a lens unit is provided in said aperture, said lens unit having a plurality of first lens segments each covering an area on said lens unit and each having a selected first lens center for focusing infrared radiation onto said detector element from a corresponding beam of infrared sensitivity, the improvement wherein there is provided a plurality of second lens segments, each located within the area of a corresponding one of said first lens segments and each having an effective lens area between about 5 and 25 percent of the area of its corresponding first lens segment, each of said second lens segments having a lens center displaced from the lens center of the corresponding first lens segment by said selected displacement whereby said second lens segments focus light from said light source into a plurality of beams corresponding to said sensitivity beams.

12. The improvement specified in claim 11 wherein each of said second lens segments is within the area of said corresponding first lens segments.

13. The improvement specified in claim 11 or claim 12 wherein said light source is displaced below said detecting element whereby said first lens segments focus light from said light source above said sensitivity beams.

14. The improvement specified in claim 11 or 12 wherein the effective lens area of said second lens segments is approximately 10% of the effective area of said corresponding first lens segments.

15. A passive infrared intrusion sensing device, comprising:

an enclosure having an aperture;

an infrared detecting element in said enclosure;

an alarm circuit, connected to said detecting element for providing an electrically detectable indication in response to a detecting element output above a selected threshold level;

a light source within said enclosure having a selected spacing from said infrared detecting element; and a lens unit, mounted in said aperture, said lens unit comprising:

a plurality of first lens segments, each extending over an area of said lens unit, for receiving radiation from one of a corresponding plurality of first selected regions of space and each having a lens center, focal distance and effective lens area selected to focus infrared radiation emitted by an intruder within said corresponding first selected region of space onto said detecting element with sufficient energy to cause said detecting element to have an output above said threshold level, and to focus light from said light source to a corresponding second region of space above all of said first selected regions of space; and a corresponding plurality of second lens segments, each located within the area of its corresponding first lens segment and having a lens center, focal distance and effective lens area smaller than the effective lens area of said first lens segment, selected to focus light from said light source into said first selected region of space and to focus infrared radiation emitted by an intruder in a third region of space onto said infrared detecting element with insufficient energy to cause said detecting element to have an output above said threshold level.

16. A passive infrared intrusion sensing device, comprising:

an enclosure, adapted to be mounted to a vertical wall, and having a nominally vertical aperture oriented outward from said wall;

an infrared detecting element in said enclosure, having a selected first spacing from said aperture;

an alarm circuit, connected to said detecting element for providing an electrically detectable indication in response to an output from said infrared detecting element above a selected threshold level;

a light source, mounted within said enclosure vertically below said detecting element by a selected second spacing; and a lens unit, mounted in said aperture, said lens unit comprising:

a plurality of first lens segments, each extending over an area of said lens unit, for receiving radiation from one of a corresponding plurality of first selected regions of space, each of said first lens segments having a focal distance corresponding to said first spacing, and having a lens center between said detecting element and said first selected corresponding region of space, said lens center being vertically above said light source, and having an effective first lens area to focus infrared radiation emitted by an intruder within said corresponding first selected region of space onto said detecting element with sufficient energy to cause said detecting element to have an output above said threshold level and to focus light from said light source to a corresponding second region of space above all of said first selected regions of space; and a corresponding plurality of second lens segments, each located within the area of its corresponding first lens segment, and for focusing radiation from said light source into corresponding first selected region of space, each of said second lens segments having a focal distance corresponding to said first spacing, having a lens center vertically below said lens center of said corresponding first lens segment by said selected second spacing and having an effective second lens area, less than said effective first lens area, to focus infrared radiation emitted by an intruder within a corresponding third region of space onto said infrared detecting element with insufficient energy to cause said detecting element to have an output above said threshold level.

17. In a passive infrared intrusion detector wherein an infrared detecting element is enclosed within an enclosure having an aperture formed in one wall of said enclosure, wherein there is provided a light source in said enclosure having a selected displacement from said detecting element, and wherein a lens unit is provided in said aperture, said lens unit having a plurality of first lens segments each covering an area on said lens unit and each having a selected first lens center for focusing infrared radiation into said detector element from a corresponding beam of infrared sensitivity, the improvement wherein there is provided a plurality of second lens segments, each corresponding to one of said first lens segments and each having a substantially smaller effective lens area than and located within the lens area of the corresponding first lens segment, each of said second lens segments having a lens center displaced from the lens center of the corresponding first lens segment by said selected displacement whereby said second lens segments focus light from said light source into a plurality of beams corresponding to said sensitivity beams.

18. The improvement specified in claim 17 wherein the effective lens area of said second lens segments is between 5 and 25 percent of the area of said corresponding first lens segments.

* * * * *